US007660820B2

(12) United States Patent
Alexander et al.

(10) Patent No.: US 7,660,820 B2
(45) Date of Patent: Feb. 9, 2010

(54) CONTEXT-BASED HETEROGENEOUS INFORMATION INTEGRATION SYSTEM

(75) Inventors: Jonathan E. Alexander, San Mateo, CA (US); Phillip M. Fernandez, Palo Alto, CA (US); David L. Morandi, Palo Alto, CA (US); Mehran Sahami, Redwood City, CA (US); Benjamin W. Wu, San Carlos, CA (US); Salim S. Yusufali, Hayward, CA (US)

(73) Assignee: E.Piphany, Inc., San Mateo, CA (US)

( * ) Notice: Subject to any disclaimer, the term of this patent is extended or adjusted under 35 U.S.C. 154(b) by 704 days.

(21) Appl. No.: 10/292,777

(22) Filed: Nov. 12, 2002

(65) Prior Publication Data

US 2004/0093350 A1 May 13, 2004

(51) Int. Cl.
*G06F 7/00* (2006.01)
*G06F 17/00* (2006.01)
*G06F 3/00* (2006.01)
*G06F 9/46* (2006.01)
*G06F 3/048* (2006.01)
*G06F 15/02* (2006.01)
*G06N 7/00* (2006.01)
*G06N 7/08* (2006.01)

(52) U.S. Cl. .............................. 707/104.1; 707/103 Y; 715/700; 715/809; 715/837; 705/9; 706/55; 718/100

(58) Field of Classification Search ................ 707/103, 707/104.1; 706/55; 705/9; 715/700, 809, 715/837; 718/100
See application file for complete search history.

(56) References Cited

U.S. PATENT DOCUMENTS 5,050,207 A * 9/1991 Hitchcock ................ 379/93.19

(Continued)

*Primary Examiner*—Uyen T Le
*Assistant Examiner*—Cheryl M Shechtman
(74) *Attorney, Agent, or Firm*—Blank Rome, LLP

(57) ABSTRACT

A system and method are provided that overcome the previously described limitations of prior art systems. The computer system, in fact, uses a set of information objects to interface with heterogeneous information sources. Information objects can be combined to form tasks that can be added, deleted and modified without requiring any modifications to the underlying program. In addition, the computer system allows users to navigate through a task and automatically generates links to related tasks based on the contextual information in which each step in the task is performed. As a result, links to related tasks do not have to be defined ahead of time, but rather can be dynamically generated at run time. This is accomplished by associating a semantic type or multiple semantic types with the information generated during each step. This allows the system to present links to tasks that utilize the same semantic types generated during the previous step. Thus, if a new task that operates on a given semantic type is created, links to that task are automatically generated during processing of related tasks without requiring any modifications to the underlying program. Semantic types, therefore, allow the system to capture, convert and integrate multiple heterogeneous data sources that contain data pertaining to the same entity. Furthermore, a graphical editor is provided that allows tasks to be easily added, deleted or modified to adapt to changing business processes without requiring new code to be written.

42 Claims, 18 Drawing Sheets

U.S. PATENT DOCUMENTS 5,727,174 A * 3/1998 Aparicio et al. ............. 715/837
5,917,489 A * 6/1999 Thurlow et al. ............. 715/809

2002/0055868 A1 * 5/2002 Dusevic et al. ................. 705/9

* cited by examiner

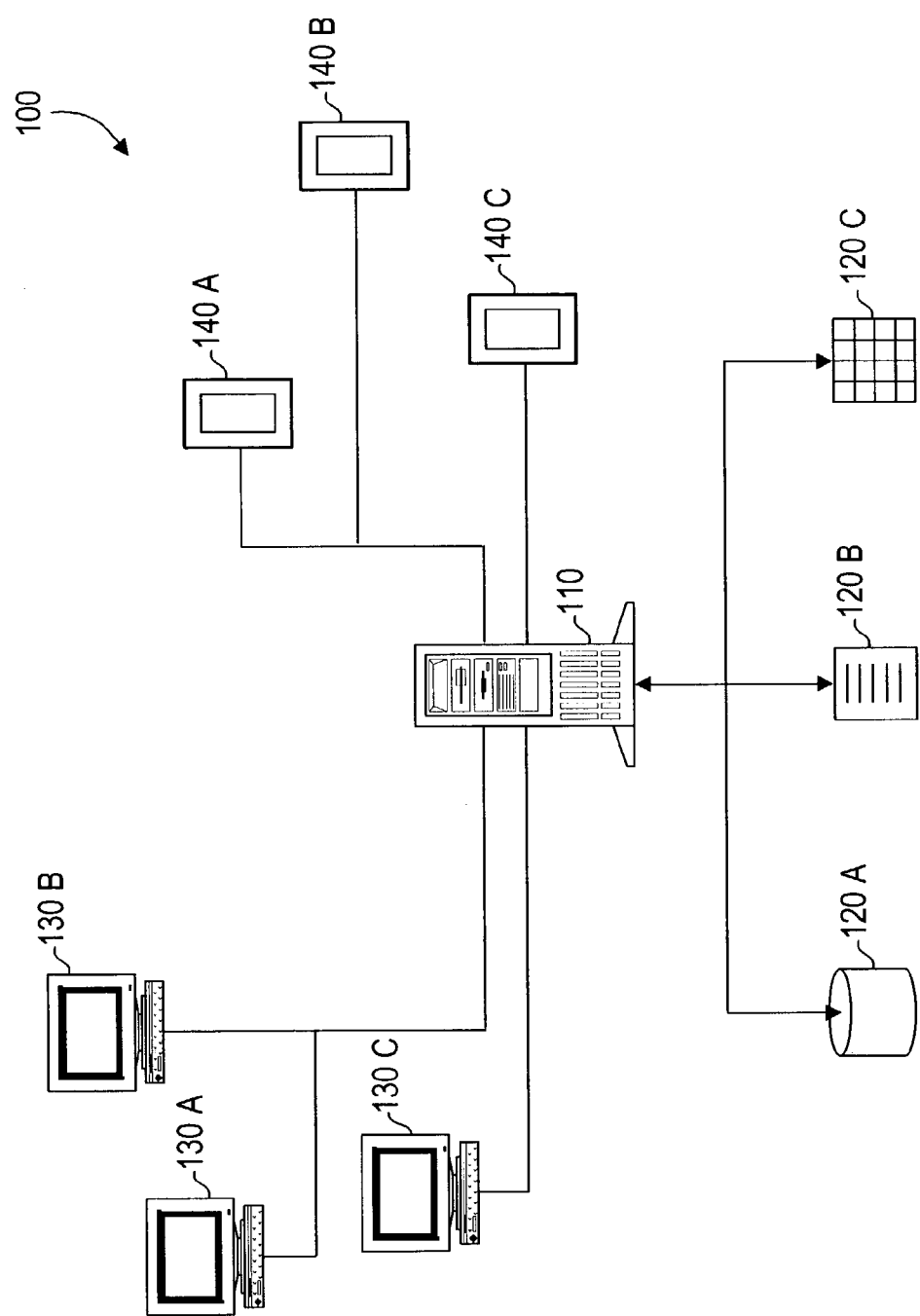

| Fig. 5A |
| Fig. 5B |

Fig. 6A

Alerts

You Have 5 New Alerts! Save New Alerts for [2 days ▷]

1. ✗ Customer Service Alert (September 13, 2002, 8:05 am) — 610 A
   Customer: ABC Brothers
   Status: Will be resolved by Ann Lynch in customer service by the end-of-business today
   Urgent request for prospectus information on new International funds 2. ✗ New Sales Opportunity Alert (September 13, 2002, 8:00 am) — 610 B
   Customer: Jones Brokerage
   Revenue: ($20 million at 5% Probability)
   Equity funds bundled purchase 3. ✗ Marketing Department Alert (September 13, 2002, 7:45 pm) — 610 C
   The email campaign for retirement products has been launched to all platinum brokers.

4. ✗ Quota Alert (September 12, 2002, 1:00 pm) — 610 D
   You are $13.2 million short of your mutual funds quota ($20MM) for Q3 2001.

Calendar

Today - September 13, 2002

8:00 AM - 8:30 AM Daily Staff Meeting

11:00 AM - 12:00 PM Conference Call with Tom Halloran at Charles Lynch — 650-255-1555

1:00 PM - 3:00 PM Sales Meeting at ABC Brothers — 245 Main Street, Burlingame

5:00 PM - 6:00 PM Racquetball

View Calendar

Activities

◇ Learn More About This Customer — 620 B
◇ Learn More About This Product — 620 C

Pages

▭ View Customer Page
▭ View Product Page

Fig. 6B

| My Views » | Next Steps | |
|---|---|---|
| Find » | ⇨ | View 2 hot product recommendations for ABC Brothers<br>View real-time recommendations based upon ABC Brothers' activities |
| 710 | ⇨ | View ABC Brothers' past purchase history<br>See what ABC Brothers has purchased in the past, to learn where new opportunities may exist |
| | ⇨ | See 3 marketing campaigns currently in effect with ABC Brothers<br>Be sure to reinforce marketing campaigns already in place |
| | ⇨ | View the 1 critical open service request for ABC Brothers<br>Make sure to address this item before launching into sales pitch |
| | ⇨ | Get driving directions to ABC Brothers |

Fig. 7B

Customer Intelligence: ABC Brothers

Settings: Customer = ABC Brothers

« Customer Profile

| | |
|---|---|
| 2001 Total Expected Telecom Purchases: | $75 million |
| Estimated Allocation Across Product Groups: | 50% Data |
| | 25% Wireless |
| | 25% Voice |
| Competitor Purchases: | AT&T |
| | Sprint |
| Preference stated for Bay Area | Qwest |
| Telecom Products: | Neutral |

910 A

« Historical Sales To ABC Brothers (1998-Pre

| Products | 1998 | 1999 | 200 |
|---|---|---|---|
| Data | $9,477,000 | $10,530,000 | $11,7 |
| Wireless | $2,025,000 | $2,250,000 | $2,5 |
| Voice | $6,075,000 | $6,750,000 | $7,5 |
| Total | $17,577,000 | $19,530,000 | $21,7 |

Fig. 9
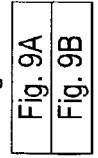

| Semantic Type | Lookup ID | Corr. Label ID |
|---|---|---|
| Customer | CustomerLink.Code | |
| Product | Product_Affected | Product_Affected |
| ServiceRequest | code | |
| | Add Column Lookup | |

Report

Name: Request Details

Column Lookups

| Semantic Type | Lookup ID | Corr. Label ID |
|---|---|---|
| ServiceRequest | code | |
| Product | Product_Affected | Product_Affected |
| | Add Column Lookup | |

Report

Name: RequestJournalEntries

Column Lookups

| Semantic Type | Lookup ID | Corr. Label ID |
|---|---|---|
| ServiceRequest | RequestLinks.Code | |

⇨ Product QV Activity
⇨ Recommend a Product to a Customer
⇨ Sales Effectiveness QuickView Activity
⇨ Sales Snapshot QV Activity
⇨ Target Customers for Add-on Sales
⇨ Whats Hot Activity

[+] Nuggets and Composite Nuggets
[+] Helpers
[+] ICs
[+] Parameters
[+] Source Systems

CONTEXT-BASED HETEROGENEOUS INFORMATION INTEGRATION SYSTEM

BACKGROUND OF THE INVENTION

1. Field of the Invention

The present invention relates generally to computer systems and, in particular, to computer systems for processing information from multiple sources.

2. Related Art

Current Customer Relationship Management (CRM) systems along with other systems that process and present business data typically allow users to search, view and manipulate data from multiple sources having incompatible formats using a common interface. Typically, these systems provide a portal-like front end that present a broad categorization of the information available and the user can drill-down on specific information the user of interest. XML (extensible markup language) is sometimes used to capture information that is not displayed by the front end, but can be used by a computer program (e.g. a search engine) to analyze the content of the information displayed by the front end. A semantic web, for example, has been proposed that would use XML to allow search engines to recognize and analyze semantic information embedded on webpages. Prior art CRM systems, however, are typically based on custom programs tailored to a specific business process. As a result, these systems require users to specify in advance how the data extracted from the underlying data sources is presented to the user. Furthermore, any changes to the way the data is presented or to the business process require extensive modifications of the underlying programs to be performed by skilled programmers. As a result, these systems are not well suited to implementing dynamic business processes that may need to be modified on a regular basis. It would be desirable to provide a system that can be dynamically modified in response to changes in the underlying business processes.

In addition, using these systems, the entire business process must be modeled in advance and the user must navigate through the same path every time an operation is performed. As a result, the navigation options available to each user must be defined before the program is written. This is particularly undesirable in situations where information is to be presented to the user depending on the contextual situation of the operation performed by the user. Using current systems, in fact, each situation in which the information is to be presented by the user must be recognized ahead of time and provided for in the program. By contrast, it would be desirable to provide a system that dynamically routes the user to relevant information depending on the contextual situation of the user's operation.

SUMMARY OF THE INVENTION

A system and method in accordance to some embodiments of the invention are provided that overcome the previously described limitations of prior art systems. The computer system, in fact, uses a set of information objects to interface with heterogeneous information sources. Information objects can be combined to form tasks that can be added, deleted and modified without requiring any modifications to the underlying program. In addition, the computer system allows users to navigate through a task and automatically generates links to related tasks based on the contextual information in which each step in the task is performed. As a result, links to related tasks do not have to be defined ahead of time, but rather can be dynamically generated at run time.

This is accomplished by associating a semantic type or multiple semantic types with the information generated during each step. This allows the system to present links to tasks that utilize the same semantic types generated during the previous step. Thus, if a new task that operates on a given semantic type is created, links to that task are automatically generated during processing of related tasks without requiring any modifications to the underlying program. Semantic types, therefore, allow the system to capture, convert and integrate multiple heterogeneous data sources that contain data pertaining to the same entity.

Furthermore, a graphical editor is provided that allows tasks to be easily added, deleted or modified to adapt to changing business processes without requiring new code to be written.

BRIEF DESCRIPTION OF THE DRAWINGS

FIG. 1 is a block diagram of a computer system, in accordance to some embodiments of the invention.

FIGS. 6A and 6B illustrates composite nuggets displayed by the computer program of FIG. 2A, in accordance to some embodiments of the invention.

FIGS. 7A and 7B illustrate Next Steps in a window displayed by the computer program of FIG. 2A, in accordance to some embodiments of the invention.

FIGS. 9A and 9B illustrate a section of a QuickView in a window displayed by the computer program of FIG. 2A, in accordance to some embodiments of the invention.

FIGS. 11A, 11B, 11C and 11D illustrates a user interface for specifying semantic type information in a window displayed by the computer program of FIG. 2A, in accordance to some embodiments of the invention.

DETAILED DESCRIPTION OF THE INVENTION

Figure 2A:
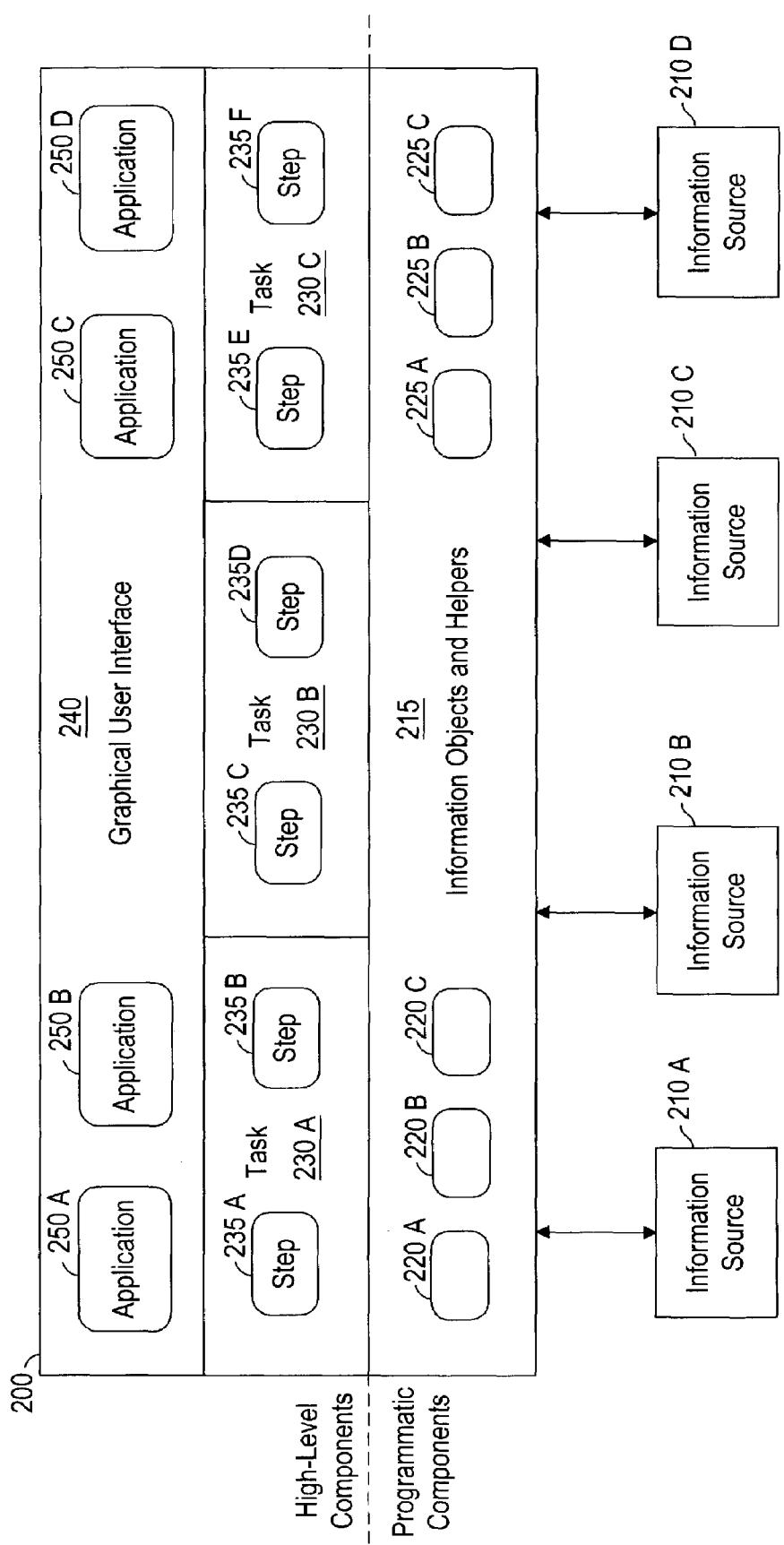
FIG. 2A is a block diagram of a computer program executed by the computer system of FIG. 1.

A computer system 100 for context-based integration of heterogeneous information, in accordance to some embodiments of the invention, is shown in FIG. 1. Computer system 100 includes a server computer 110 connecting a plurality of data sources 120$n$ (where n=A, B, C . . . ) to a plurality of client computers 130$n$ and/or a plurality of PDAs 140$n$. Examples of data sources 120$n$ include databases, files, spreadsheets and the like. In some embodiments, devices other than client computers and PDAs such as cellular telephones, two-way pagers and the like can be used in place of client computers 130$n$ or PDAs 140$n$ in accordance to the principles of the present invention. A computer program 200 is configured to operate on computer system 100. The architecture of computer program 200 is illustrated in FIG. 2A. Computer system 200 includes a graphical user interface layer 240, tasks 230$n$ and an information objects and helpers layer 215. Computer program 200 interfaces with a plurality of heterogeneous information sources 210n that can reside on one or more data sources 120n (FIG. 1). Information objects 220n extract data from one or more information sources 120n and translate the data into a format suitable for processing by tasks 230 and graphical user interface layer 240. Helpers 225n are used to translate data extracted from data extracted from information sources 210n by information objects 220n, but do not communicated with information sources 210n directly. Tasks 230 include one or more steps 235n and capture workflows by defining which steps may be executed after execution of the current step. During execution of a step 235n, information is retrieved from and presented to a user through graphical user interface layer 240. One or more information components are used to retrieve information from information sources 210n during execution of a step 235n based on user specified parameters. At the conclusion of each step 235n, the corresponding task 230n determines which steps 235n, if any, may be executed next. In addition, unlike in prior art workflow modeling systems, the workflow is not limited to steps 235n of task 230n. Rather, a semantic type associated with input and output parameters of each step 235n is used to determine which tasks are available for execution based on the results of the execution of a previous step 235n. Thus, a task 230n is available for execution only when a previous step generates output parameters that have the same semantic type as the input parameters of the task 230n to be executed. As a result, after each step 235n, the user may choose either one of the "Next Steps" defined by the current task 230n or a new task dynamically determined based on the semantic types generated during execution of step 235n. In some embodiments, new tasks available for execution are determined based both on semantic types and business rules used to analyze the semantic types. For instance, a step that generates an output of semantic type Customer could be analyzed by a business rule to determine whether there are any open orders for that customer and generate a link to an order review task only if there are in fact pending orders for that customer.

Finally, graphical user interface layer 240 may comprise several application programs 250n that leverage underlying tasks 230n and information objects and helper layer 215 to implement business applications. Application programs 250n are thus able to share all of the underlying components of computer program 220, greatly simplifying the task of developing new application programs 250n.

Figure 2B:
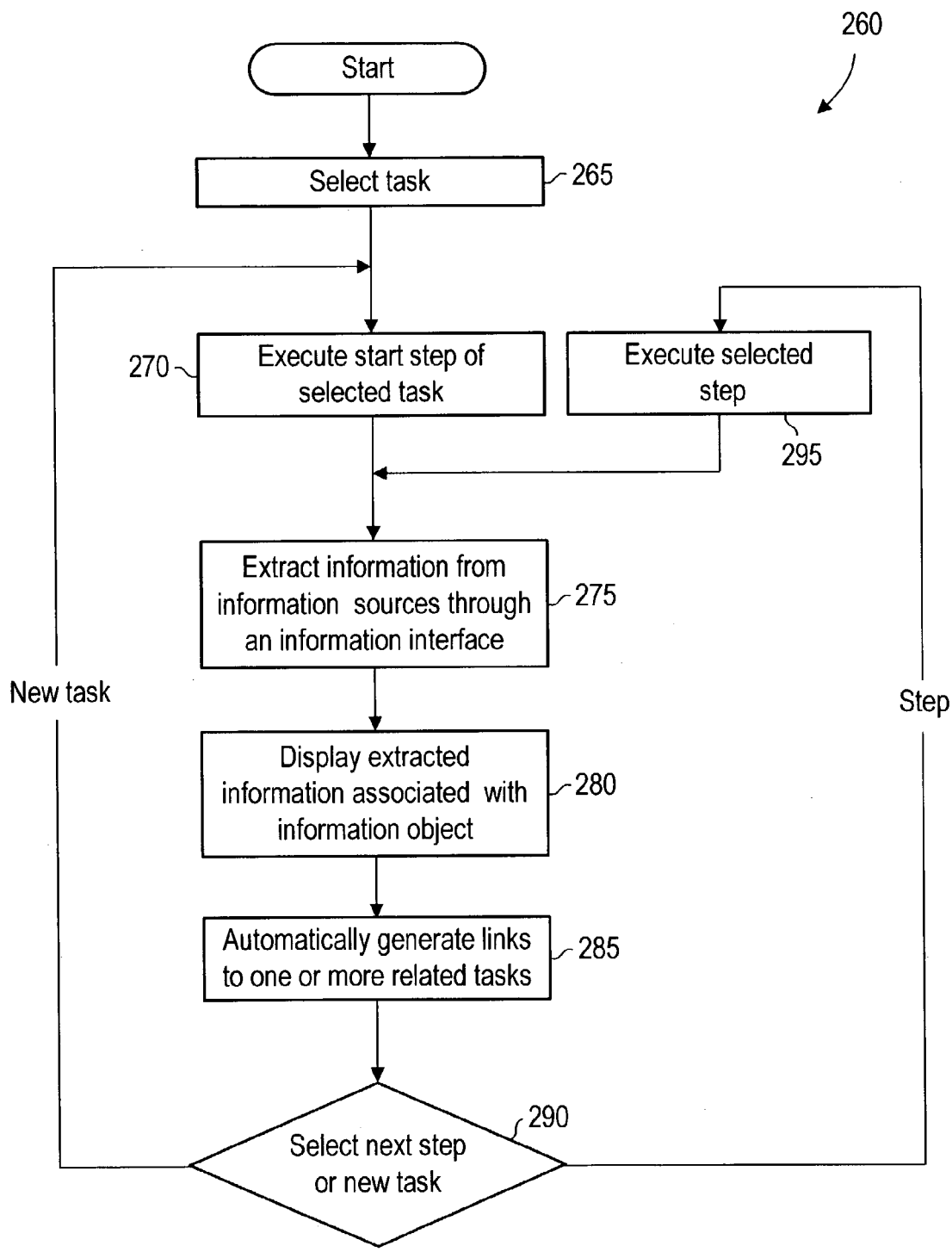
FIG. 2B is a flow diagram describing the operation of the computer program of FIG. 2A.

The operation of computer program 200 is further illustrated by operation 260 of FIG. 2B. Initially, a user of computer program 200 selects a task (stage 265) through graphical user interface layer 240. The start step of the selected task is then executed (stage 270). As part of the execution of the step, information associated with the information objects of the step is extracted from information sources 210n (stage 275). The extracted information is then displayed by graphical user interface layer 240 (stage 280). Links to steps and other tasks to which the user can navigate are then generated and displayed by graphical user interface layer 240 (stage 285). Stage 290 then determines whether the user has selected to navigate to a next step in the same task, in which case operation 260 proceeds to stage 295 where the next step is executed and operation 260 proceeds to stage 275. Otherwise, if another task is selected, operation 260 proceeds to stage 270, where the start step of the newly selected task is executed. Stages 270-295 are repeated until the user exits computer program 200.

As shown in FIG. 2A, computer program 200 supports two types of components: programmatic components and high-level components. Information objects 220n and Helpers 225n are examples of programmatic components, while tasks 230n, steps 235n and applications 250n are examples of high-level components. By utilizing both programmatic and non-programmatic components, the architecture of computer program 200 is able to provide both ease of development of high-level components and the flexibility of a programmatic interface to the underlying information objects.

Figure 3:
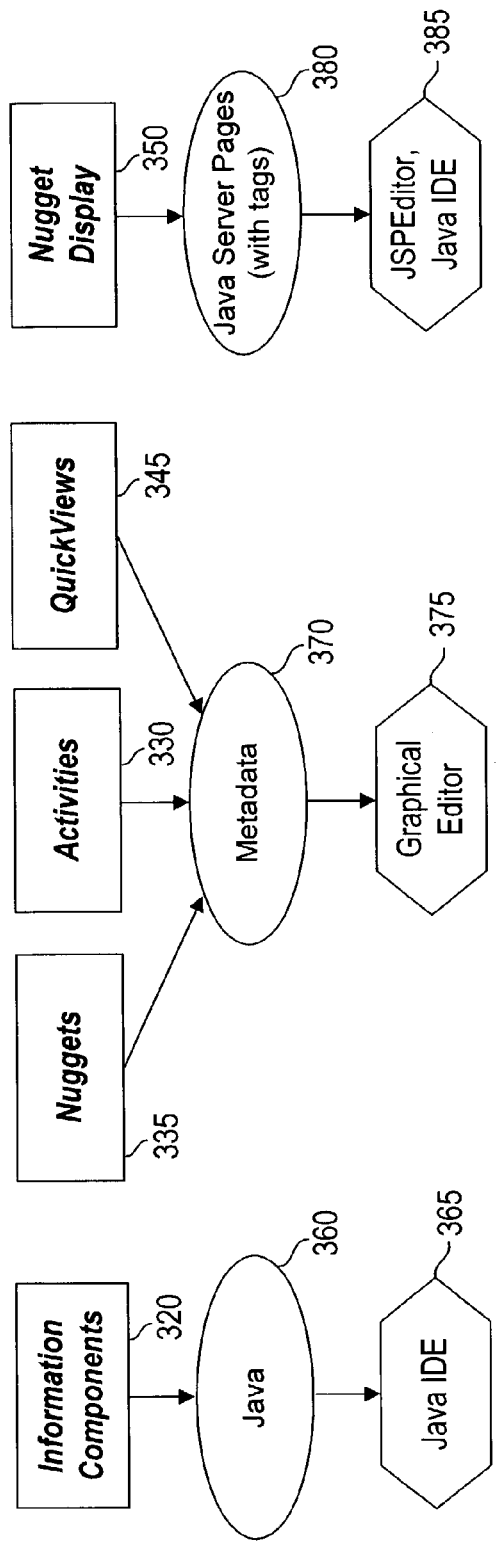
FIG. 3 is a block diagram illustrating programmatic and non-programmatic components of the computer system of FIG. 1, in accordance to some embodiments of the invention.

FIG. 3 summarizes how various programmatic and high-level components of computer program 200 are implemented, according to some embodiments of the invention. In the embodiments described in FIG. 3 and following, Information Components (IC) 320 represent information objects 220n, Activities 330 and QuickViews 345 represent tasks 230n, and Nuggets 335 represent steps 235n.

In some embodiments, ICs 320 are programmatic components written in Java programming language 360 using Java Integrated Development Environment (IDE) 365. Nuggets 335, Activities 330 and QuickViews 345 are high-level components described in metadata 370 using graphical editor 375. Finally, all the information retrieved by a nugget 335 can be graphically represented using a nugget display 350. Nugget displays 350 are implemented using Java Server Pages (JSPs) 380 composed using JSP editor 385.

Figures 5, 5A:
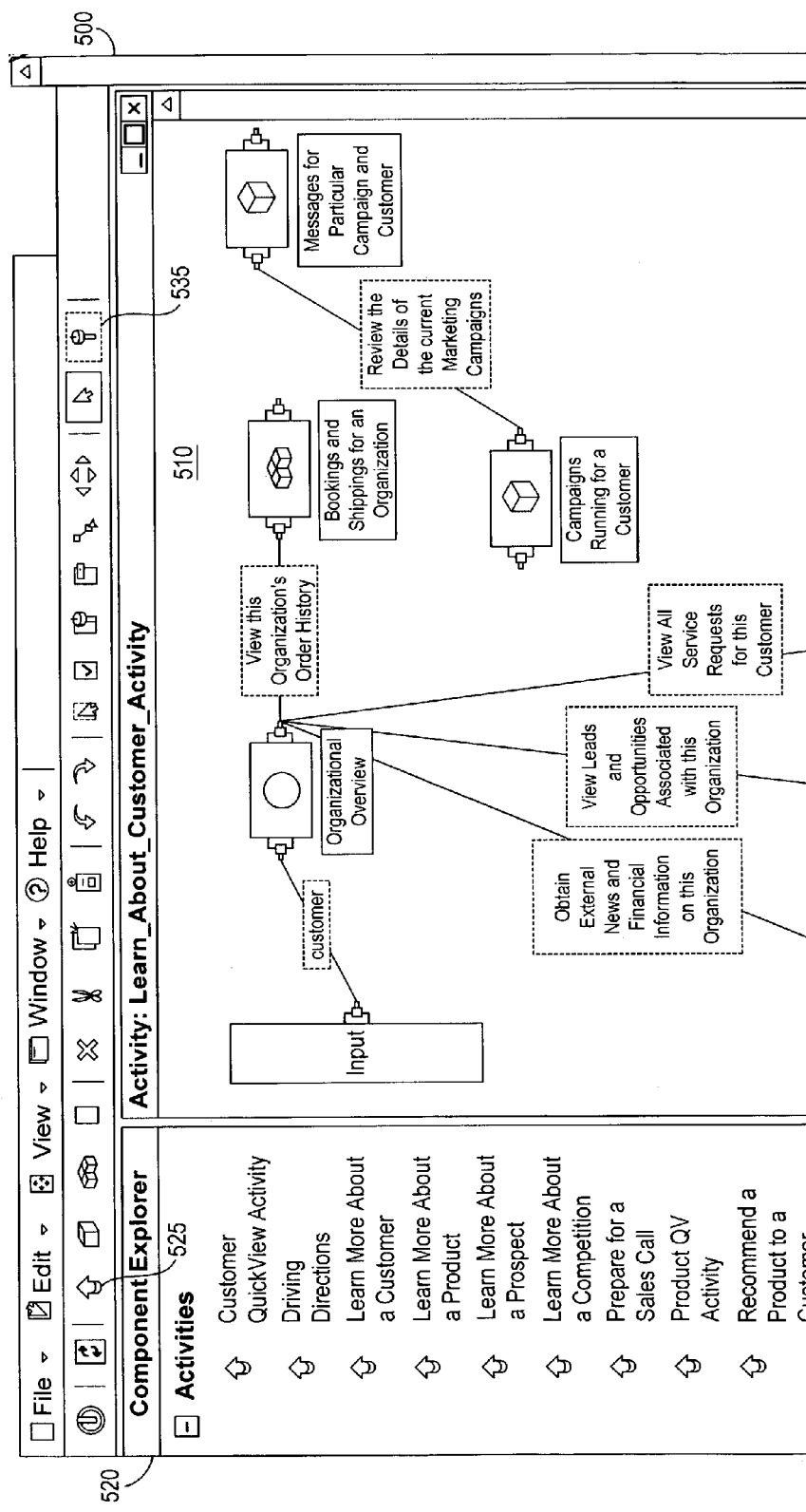
FIGS. 5A and 5B show a graphical editor, in accordance to some embodiments of the invention.
Figure 5B:
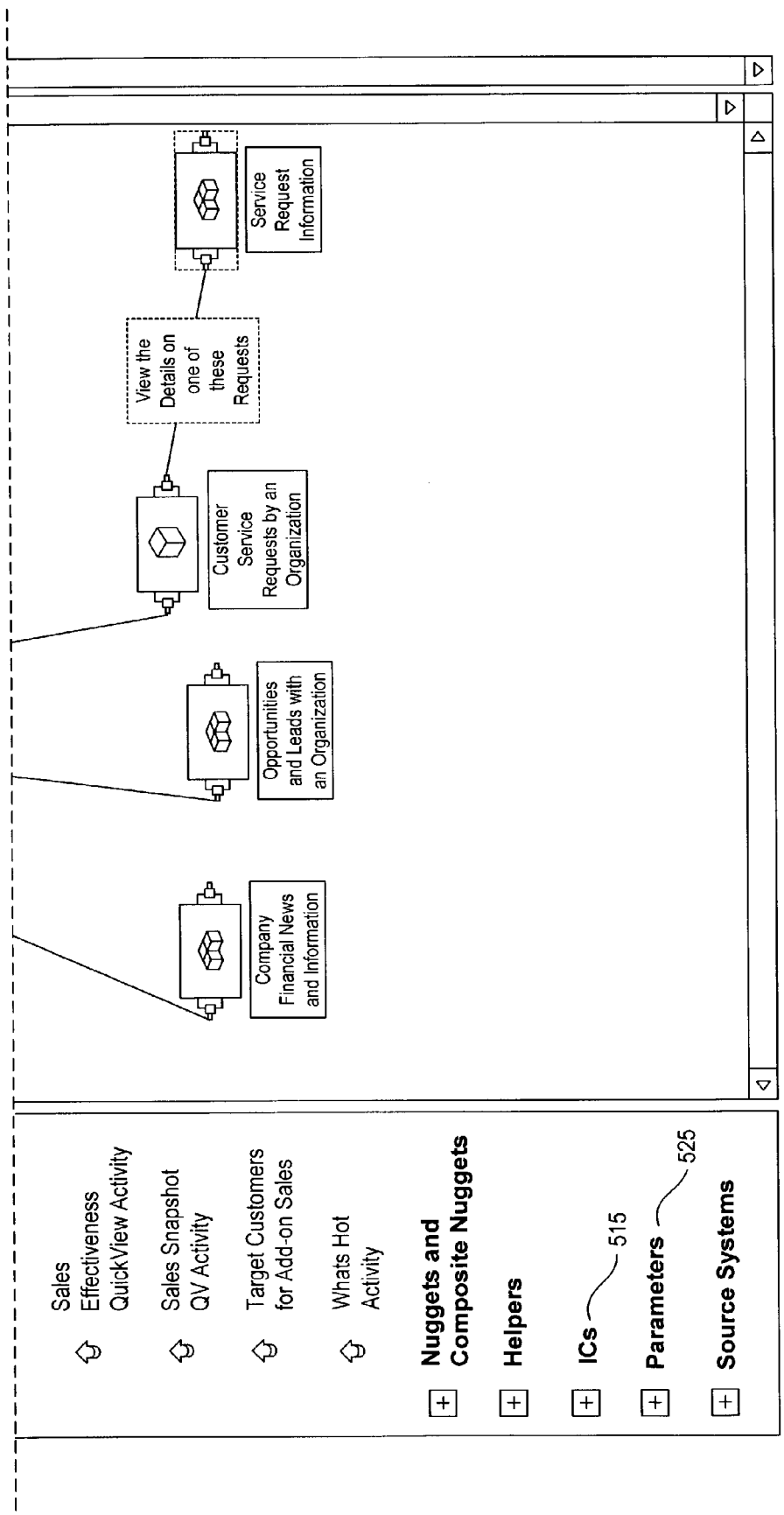

As discussed above, in the embodiment of FIG. 3, programmatic components are built in Java and use Java classes to implements business logic. In addition, programmatic components specify input and output parameter classes and can be registered into metadata 370. As a result, programmatic components can be used to build high level, non-programmatic components (e.g. nuggets 335). By registering programmatic components into metadata 370, in fact, high-level objects can be connected to programmatic components using graphical editor 500 of FIG. 5A (a process described as "wiring").

ICs 320 provide business logic used to connect to and retrieve information from information sources 210n. Examples include an IC 320 that connects to a company's financial system to retrieve financial information about an individual or an IC 320 that makes a call across the Internet to retrieve real-time data such as traffic or stock quote data. ICs enable computer program 200 to connect to information sources 210n and provide a modular way to extend information available to users. ICs 320 include Java classes and represent encapsulated business logic. The Java class for an IC 320 can either have all the business logic implemented within it, or it can be a simple proxy to call other sources of information such as a Web Service or an Enterprise Java Bean (EJB).

ICs 320 consist of three Java classes. An IC input parameter class 410 encapsulates information available to IC 320 when executing, an IC Java class 420 contains the code to connect to and get information from a data source, and an IC output parameter class 430 encapsulates information that is available for display, and to pass to other Nuggets 335 (via "Next Steps") or Activities 330 (via lightbulb links) after IC 320 has executed.

Figure 4:
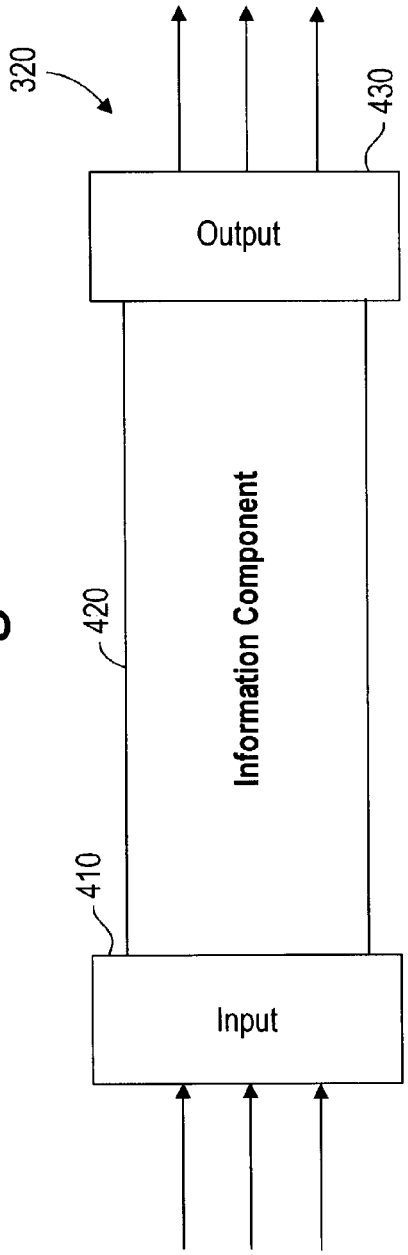
FIG. 4 is a block diagram of an information object, in accordance with some embodiments of the invention.

IC 320 has an XML descriptor and Java Server Pages (JSP) 380 are used to display data from IC 320. IC 320 can be diagrammatically represented as shown in FIG. 4. IC 320 accepts input parameters and indicates when it has finished executing, that is, when output data is available.

Once IC 320 executes, it stores the results of its execution into an output parameter. This output parameter serves multiple purposes: it is sent to the front end JSP page 380 and is accessible for display to the end user; certain properties of the output parameter can be marked as wiring properties and can be made available for wiring via Next Step links to other steps 235*n*. It is also available for lightbulb links to other Activities 330 or QuickViews 345 via lightbulb navigation.

The IC java class that performs the business logic implements an executes method that takes in an IC parameter and returns an IC parameter that are of the input and output class types defined above. A simple example of how an execute( ) method could be implemented could be for the execute code to obtain a connection to a database specified, retrieve record sets from this database, iterate through these records, and store the data from each field of these record sets into an output table parameter.

To support user navigation through Activities 330 and QuickViews 345, ICs 320 indicate what portions of their output represent semantic types. Semantic types are a mechanism for declaring input/output properties as one of the fundamental types, for example as Customer or Product, that determine which Activities 330 can be linked to. By indicating what portions of an IC 320 output represent Semantic Types, ICs 320 enable lightbulbs 610*n* to appear in an IC display output 620, as illustrated in FIG. 6. By selecting a lightbulb 610*n*, a user can navigate to corresponding Activities 330 and QuickViews 345 that specifiy compatible semantic types as input parameters.

Like an IC 320, a helper 225*n* consists of three Java classes: a helper input parameter class encapsulates the information available to helper 225*n* when executing, a helper Java class contains the "helping" code or the code that does the work of helper 225*n*, and an helper output parameter encapsulates the result of executing helper 225*n*. Like an IC 320, a helper also has an XML descriptor that identifies the Java classes that are associated with helper 225*n*. Unlike ICs 320, however, helpers 225*n* do not have a visual display associated with them.

Nuggets 335, Activities 330 and semantic types represent business notions that span multiple applications 250*n*. Nuggets 335 represent relevant pieces of information from applications 250*n* and information sources 210*n*. Examples of nuggets 335 include a rows and column OLAP report, customer service requests, top sales opportunities, company financials, and company profiles. Nuggets 335 are the basic building blocks of Activities 330 and QuickViews 345. Nuggets can be created and edited using graphical editor 500. A nugget 335 is a combination of an IC 320 (with set input parameters) and a JSP for displaying the IC output. From a technical viewpoint, a nugget 335 represents a configured instance of an IC 320 that is used for display in Activities 330 and QuickViews 345. A nugget 335 that contains multiple nuggets is called a "composite nugget." Instances of IC s 320 or nuggets 335 are configured for display in Activities 330. Configuration information includes input parameters that instantiate the IC 320. Once nuggets 335*s* are configured, they are added to Activities 330. Some steps in an Activity 330 display one nugget 335 while other steps display multiple nuggets 335. Configured nuggets 335 may be used to develop Activities 330 without delving into the internal configuration of nuggets 335.

Nugget 335*s* can be created using the graphical editor 500 by selecting Create a New nugget icon 525 from toolbar 530. An empty nugget 335 with input and output rectangles is then displayed in the design canvas 510. The user can then expand the IC node 515 in component explorer 520, expand ICs 320 to show available ICs 320. An IC 320 can be added to nugget 335, by selecting IC 320 in the component explorer 520 and dragging it on to design canvas 510. Optionally, an input can be specified for nugget 335 by expanding parameters node 525 and dragging and dropping the relevant parameter on to the input rectangle in the design canvas 510. Next a wire is drawn between the nugget 335 input and the IC 320 input.

First, the user double-clicks on the input connector of nugget 335 displaying available parameters. Next the user double-clicks on the input connector of IC 320 displaying available Parameters. The user then clicks on the Create a new wire icon 535. Next the user clicks on the desired input parameter of nugget 335 and then on the desired input parameter of IC 320. If the nugget 335 has multiple parameters, all parameters may be bound by clicking on the top row of the input parameter list of nugget 335 and then clicking on the IC 320 input parameter of IC 320. Optionally, the output of nugget 335 can be wired to an input of another nugget 335 by drawing a wire from the IC 320 output to nugget 335 output. The user may also choose to edit the binding properties by double clicking on the name of the property for the wire displaying an Edit wire properties dialog box appears (not shown). The following fields can be edited: a user interaction field that selects either row from table, column from table or item from list; a user interaction field that specifies an interaction required of the user before the output of IC 320 can be passed to the output of nugget 335, and on to the input of a Next Step's nugget 335, before the Next Step can be reached; and a user interaction params field (a "+" separated array of Strings that are passed as a String array argument to a constructor for the User Interaction's Java class). The user can also add a Helper to nugget 335, using a process similar to the one described above for creating a nugget 335.

As discussed above, nuggets 335*s* are displayed in JavaServer Pages (JSP). JSP allows for clean separation of display logic from business/connector logic. Generally, a single JSP is used to display all nuggets 335 associated with a particular IC 320. Different JSPs can be used to change the display of different nuggets or a single nugget on a per-device basis. In some embodiments, nugget JSPs 380 use JSP tags to get to the various data that is available through a programmatic API with an information souce 210*n*.

Parameter definition involves declaring a parameter in metadata 370. Each parameter has property definitions. Property definitions are definitions for the input and output parameters for ICs 320 and nugget 335*s*. A nugget input parameter is a metadata-only pseudo-Java parameter that represents the input properties that an IC 320 expects from the outside (for example, a Product or a Customer Semantic Type). A pseudo-Java parameter means that the names, properties, and types of the parameter are registered in metadata 370. A nugget output parameter is a pseudo-Java parameter that represents the possible output parameters that a nugget 335 makes available to the outside via different types of links. Each nugget output parameter is created as a result of a parameter declaration.

Composite nuggets are multiple nuggets 335 displayed at one step in an Activity 330. For example, presenting a customer's book of business can involve the display of several tables and charts. Composite nuggets can be created via graphical editor 500, using a process similar to the one described above for creating nuggets 335.

Activities 330 enable flexible, guided exploration through available information in computer system 100 and represent answers to questions that users would as part of the business process. Just as nuggets 330, helpers 225*n* and composite nuggets, Activities 330 can be created and edited using graphical editor 500.

Figure 7A:
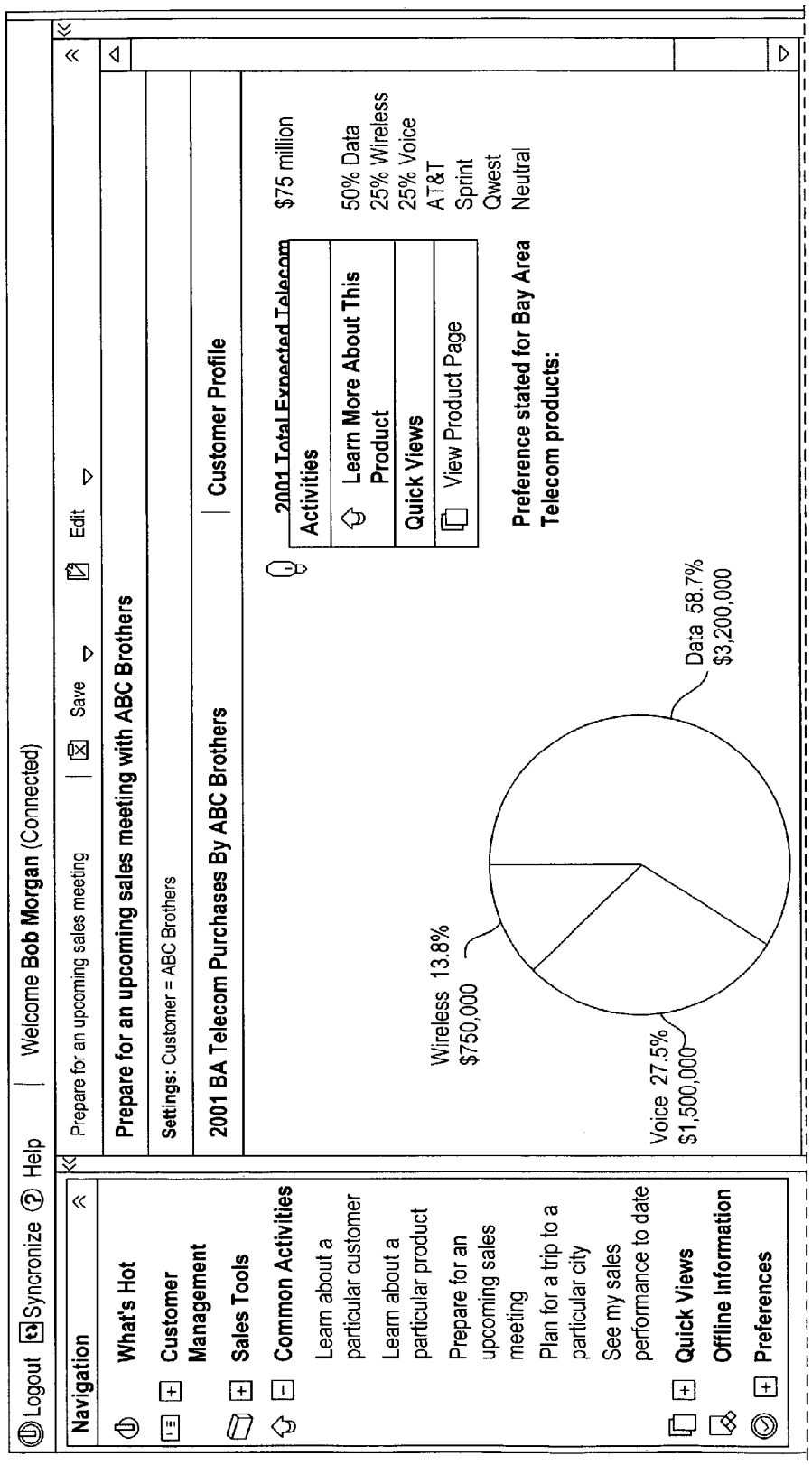

From a technical viewpoint, Activities 330 are collections of nuggets 335 and Next Steps links 710, as shown in FIG. 7B. Next Steps links 710 connect to nuggets 335 inside an Activity 330. Nuggets 335 represent information pertaining to Activity 330, and Next Steps links 710 allow the user to navigate between the activity's nuggets. Activities 330 have concrete business purposes that often have to do with a subject that is important at a particular time. Examples include preparing for a meeting with a customer and learning more about a product. The first activity, for instance, can have nuggets 335 that present the customer's current book of business, outstanding service requests, and relevant company up-sell recommendations, and a second activity can have nuggets 335 that present product historical sales, known defects, and product collateral.

Activities 330 represent ways of building navigation between nuggets 335. These navigations define Next Steps in the front end. Contextual information is carried along links in an activity. An Activity 330 has a single start nugget 335. Start nugget 335 represents the nugget that is first displayed as part of the activity. Nuggets 335 represent the information that is displayed as part of an activity. Nuggets 335 can be simple or Composite, and at each step in an activity, users will see one or more nuggets 335 of information.

Wiring between nuggets 335 specifies what information is carried during navigation. Wiring is a way to define where the value for a parameter comes from. Wiring can bind an input parameter value to either hard-coded values, the input of a composite nugget, the input of an activity, or the output from the previous nugget (step) in the activity. Next Step links represent navigation within an activity that takes a user from the current nugget to the next nugget in the activity. Next Step links connect a nugget 335 with other nugget 335s in that activity. The links can also link to external applications. However, Next Step links do not link to nuggets outside of the activity.

When a user completes viewing a nugget, the user can navigate to other nuggets in that activity by choosing one or more Next Step links. In order for this navigation to take place, however, the user may have to select some further information that serves as input to the next nugget.

Using graphical editor 500, Next Steps links may drawn from an output of one nugget 335 to an input of another nugget.

Each Activity 330 has an activity input that serves as an input parameter for the activity. The activity input can be wired to one or more nugget inputs in the activity. The activity input is typically the same input that is required for the start nugget of the activity. Implementers can refer to activity inputs for wiring purposes to any nugget input in the activity. In essence, the activity input represents state that is global to the activity. This is because Activities 330 are often centered around something of interest, like a product or a region or a customer. This item of interest can be wired to all nugget 335s in the activity. When automatically calculating lightbulb links 610n (FIGS. 6A-B), the activity input is considered. Using the Common Activities menu, users can navigate to the start nugget 335 of an activity without any previous context. For example, the start nugget might be a composite nugget centered around a customer. A customer name could be the input property to the composite nugget. In this case, the user would be given a list of customers to select from.

Lightbulb links 610n are calculated automatically at runtime by matching IC outputs with activity inputs. For example, if an IC 320 outputs Semantic Type A, it will match with all Activities 330 that take in Semantic Type A as an input. Activities 330 can take in both required and optional Semantic Type inputs. So, for example, if an activity took Semantic Type A as a required input parameter and Semantic Type B as an optional input parameter, it would be matched with all activities 230n that output only Semantic Type A as well as activities 230n that output both Semantic Types A and B.

Figure 6A:
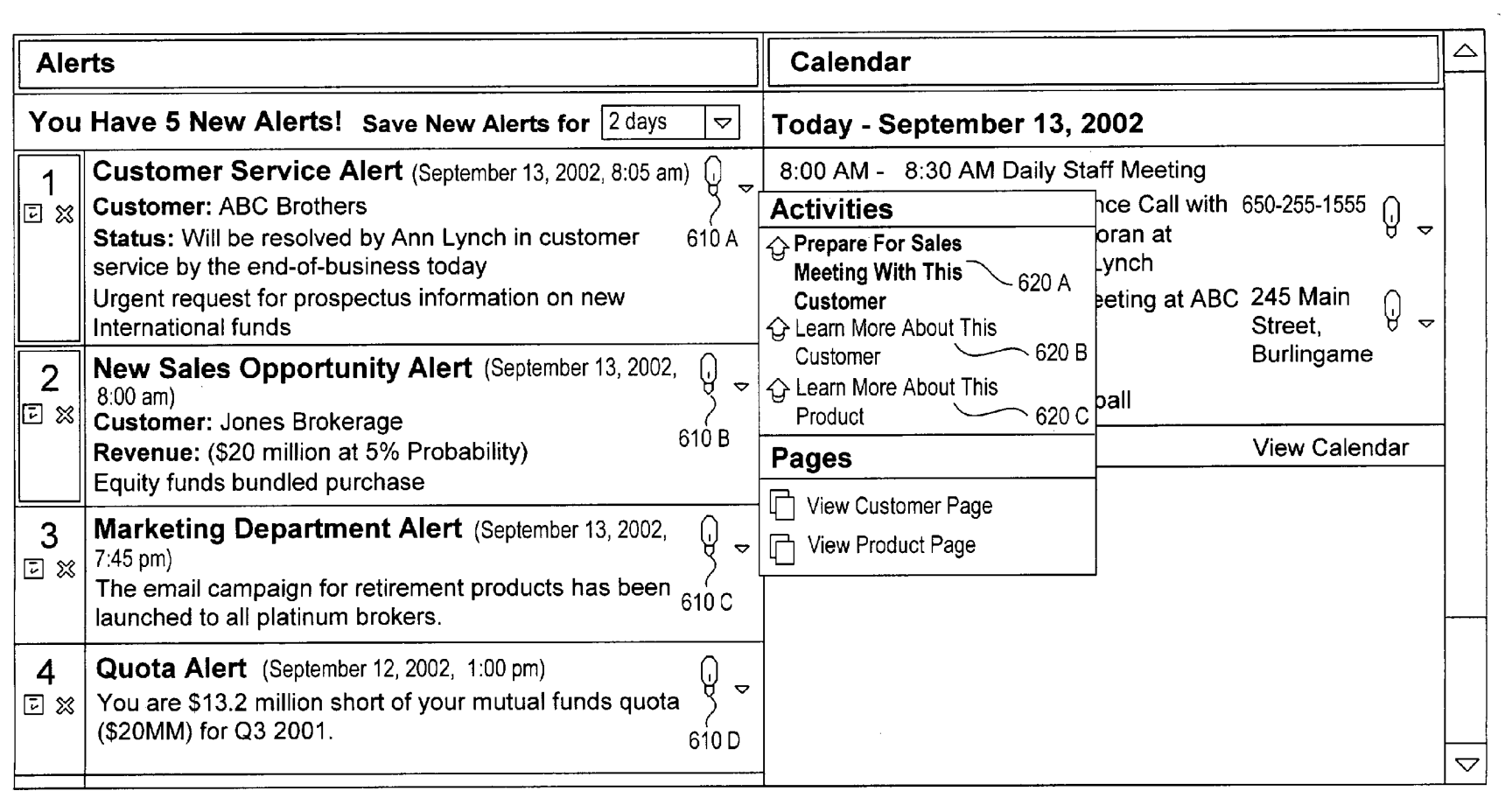

In some embodiments, as discussed above, lightbulb links are calculated using both semantic types and business rules, as illustrated in FIGS. 6A-B. FIGS. 6A and 6B show detail of a composite nugget with multiple lightbulb links 610n. Lightbulb links 610n are calculated using a combination of semantic types and business rules. For example, when the current nugget generates an output of semantic type Customer, a business rule is used to determine if there are any scheduled sales meetings with the customer in question. If a meeting is planned, the links displayed by selecting lightbulb link 610A (FIG. 6A) include links to task 620A, 620B and 620C. By contrast, if a meeting is not planned, the links displayed by selecting lightbulb link 610B (FIG. 6B) include only links to tasks 620B and 620C, but not 620A, since task 620A is not applicable under that business rule. Business rules, of course, may be more complex that the simple business rule illustrated in FIGS. 6A and 6B. In particular, business rules may use multiple inputs of different semantic types to determine which links should be provided.

Figure 8:
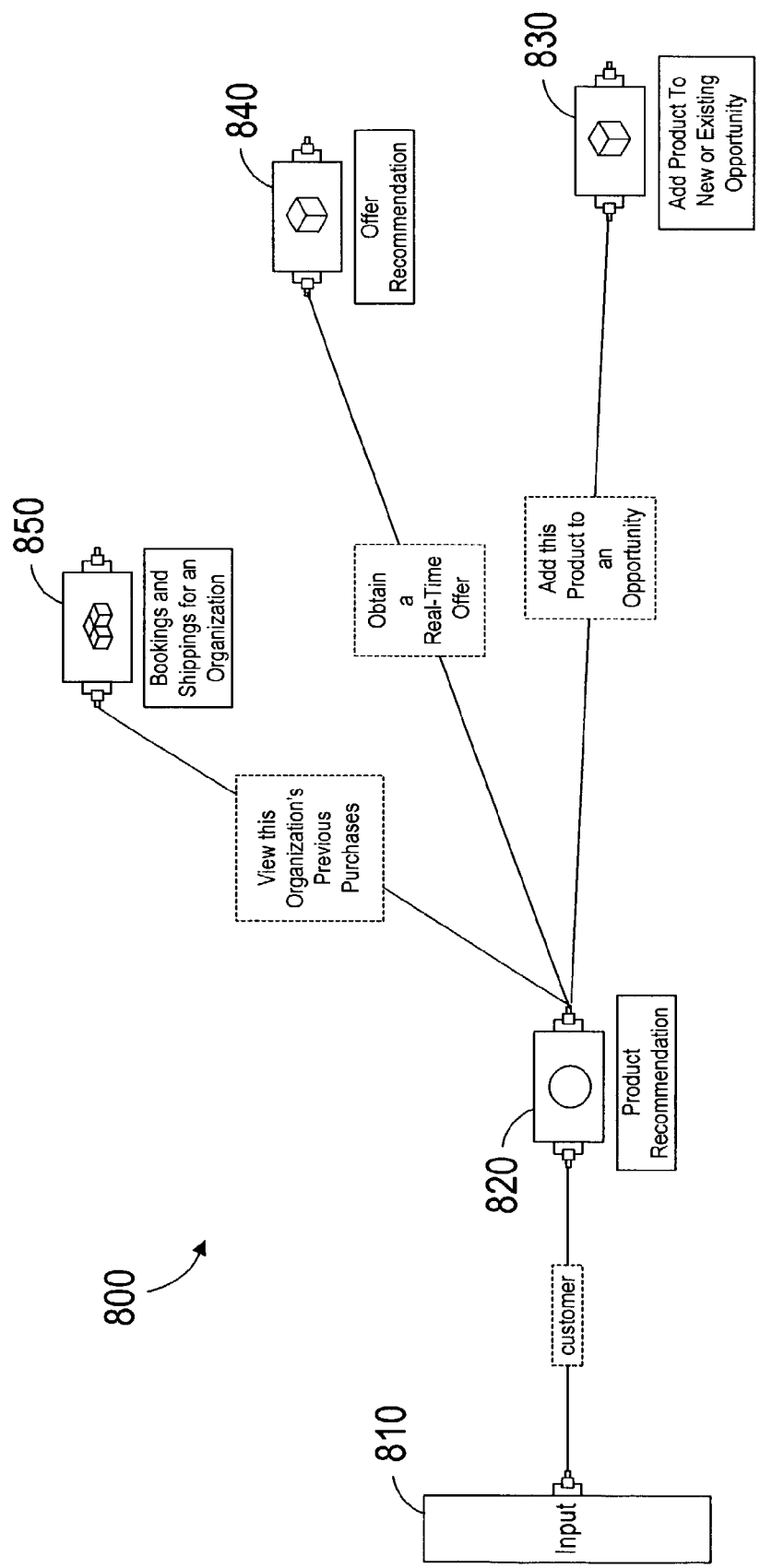
FIG. 8 illustrates an exemplary activity, in accordance to some embodiments of the invention.

As an example of the concepts discussed above, a Recommend a Product to a Customer activity 800 is shown in FIG. 8. Activity 800 provides the salesperson with the optimal product recommendations for a particular customer, maximizing the chances of completing a sale. Activity 800 takes an input 810 of semantic type Customer. A Product Recommendation nugget 820 is the Start nugget for this activity. Nugget 820 also requires an input of semantic type Customer. To accomplish this, the customer property of the activity input is wired to the customer property input of Product Recommendation nugget 820 using graphical editor 500. Nugget 820 retrieves targeted Product Recommendations from a Real Time Personalization Engine for the customer. Product Recommendation nugget 820 is connected to three other nuggets 830, 840 and 850. Add Product to New or Existing Opportunity nugget 830 is used to add the product recommendation returned by Product Recommendation nugget 820 to a new or existing opportunity in computer program 200. The end user has the option of selecting the product to add to an opportunity in the front end. Nugget 830 takes inputs of semantic types Customer and Product. The Customer input is wired from the activity input and the Product input is wired from the output of Product Recommendation nugget 820. To accomplish this a link is drawn from Product Recommendation nugget 820 to Add Product to New or Existing Opportunity nugget 830 using graphical editor 500. Bookings and Shippings for an Organization nugget 850 is a Composite nugget. Nugget 850, in fact, contains two other nuggets: a Product Booked for an Organization and a Product Shipped to an Organization nugget (not shown). Both of these nuggets output reports from an analytic service. As shown above, there is a link from Product Recommendation nugget 820 to Offer Recommendation nugget 840. Offer Recommendation nugget 840 returns Offer Recommendations from the Real Time Personalization Engine for the Customer. Nugget 840 requires an input of semantic type Customer. So the activity input is wired to the input of nugget 840 using graphical editor 500 by drawing a link from Product Recommendation nugget 820 to Offer Recommendation nugget 840. As shown in FIG. 8, links are drawn from the Start nugget to each of the Next Steps in activity 800.

Furthermore, a snapshot of an activity page or QuickView can be saved for offline viewing. Pages are saved into a file system of computer program 200 and can be accessed offline from the application front-end. Offline access provides sales representatives access to critical information when on the road without network access.

QuickViews present users with broad snapshots of relevant pieces of information at a glance, in a portal-like view. QuickViews aggregate relevant account information from multiple sources and provide a single view of the customer. Quick-Views can be created and edited using graphical editor 500. End users can also customize QuickViews in the front end.

Figure 9B:
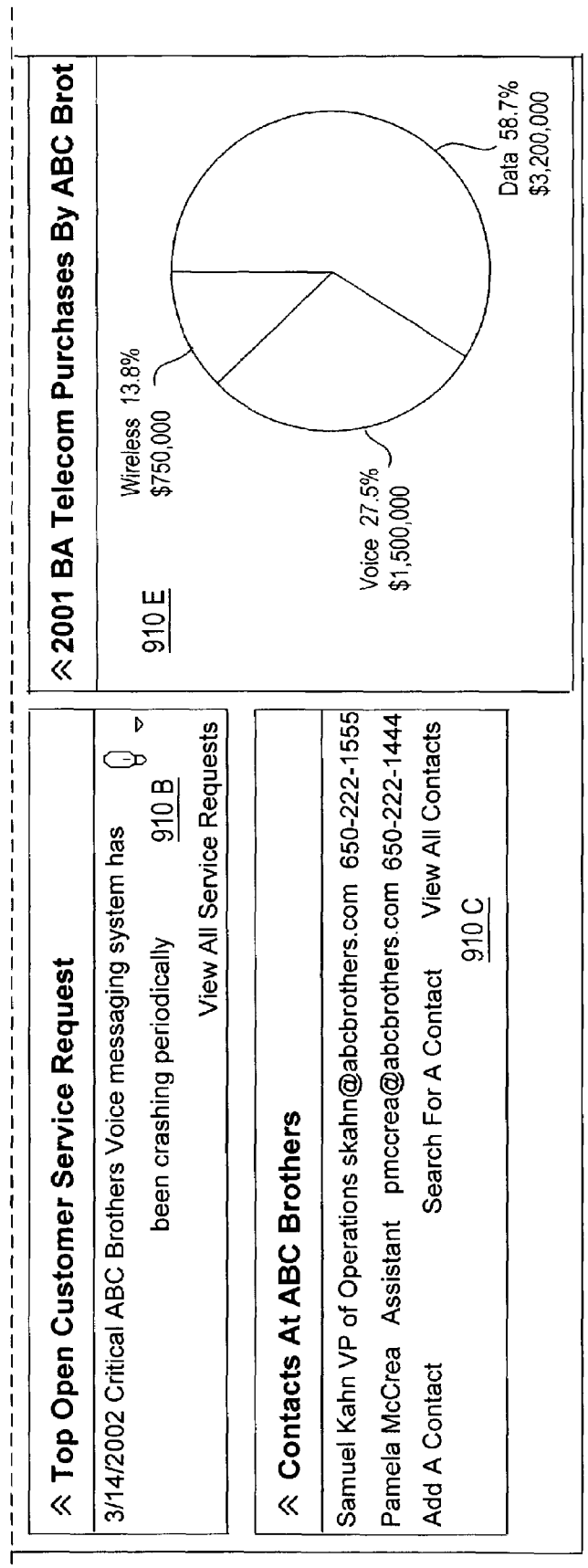

QuickViews are collections of several nuggets from any number of information sources displayed on a single page, as shown in FIGS. 9A and 9B. FIGS. 9 A and 9B show a portion of an exemplary Customer Intelligence QuickView 900 that includes several nugget displays 910*n*. QuickViews enable users to quickly prepare for customer meetings and become informed about the current status of an account. For example, a salesperson could access a Customer QuickView 345 prior to a meeting that afternoon with the account. QuickView 345 provides in one convenient place up-to-date information about the customer's most recent purchases and purchasing patterns, quarterly financial results, open service requests, and a recommended up-sell product to pursue.

Building QuickView 345*s* consists of assembling nuggets 335 related to a particular topic (for example, Sales Effectiveness or What's Hot) and adding the resulting composite nugget to an activity.

End users can customize a QuickView by configuring the layout of the nuggets that comprise the QuickView. In some embodiments, for example, both display options and page contents of a QuickView 345 can be customized.

In some embodiments, for example, display options pertain to the nuggets contained in the QuickView and involve specifying end-user settings such as the maximum number of rows to show in a table, or the output type for a report (such as chart, table, or both). Page Contents specify how the nuggets are positioned on QuickView 345. For example, this involves determining whether a nugget should be in a single column or two columns, which nugget should be added or dropped from the QuickView, and which nuggets should go on the right or left side of the QuickView.

Figure 10:
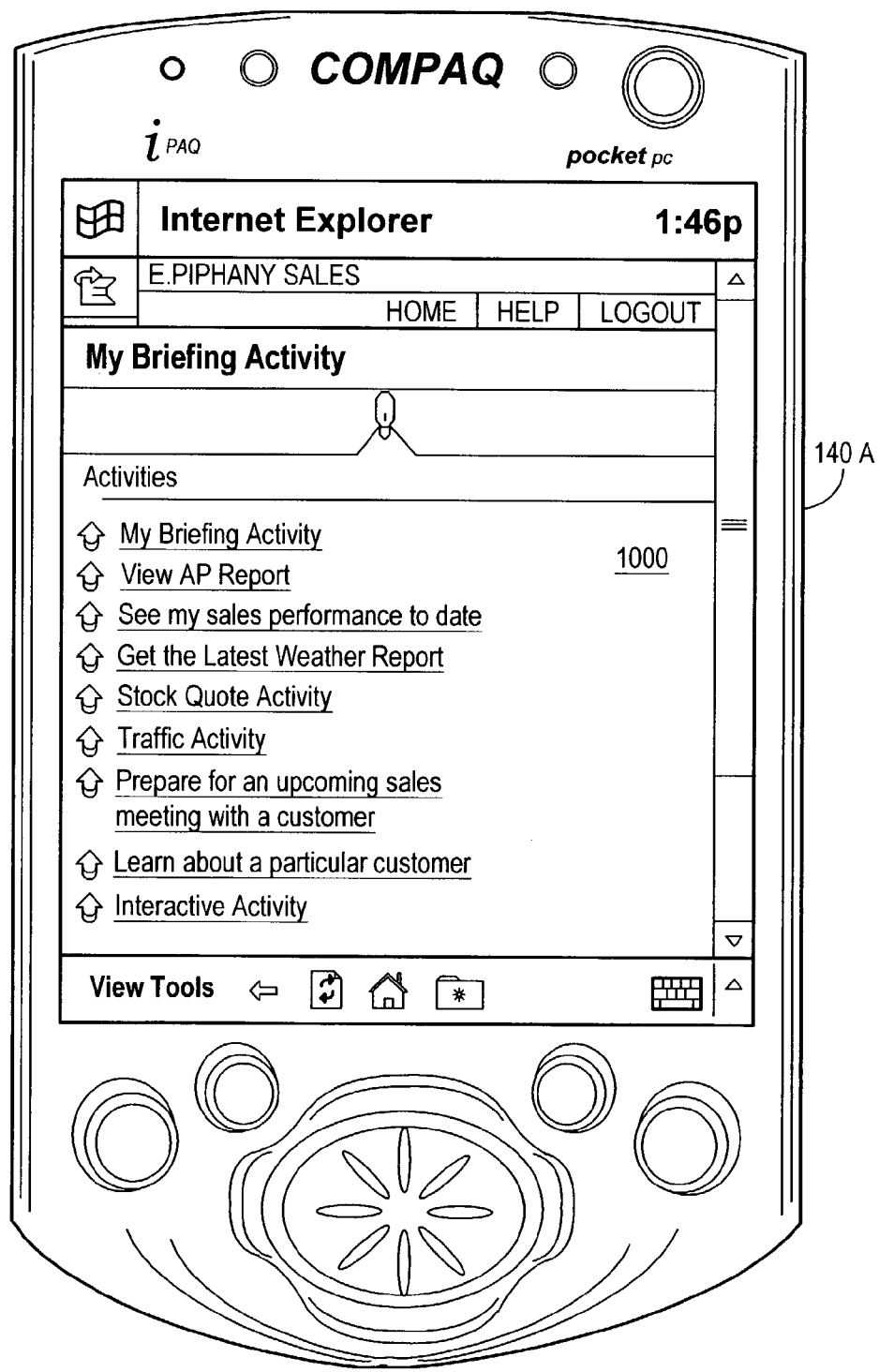
FIG. 10 illustrates a user interface displayed by the computer program of FIG. 2A on one of the PDAs of FIG. 1.
Figure 11A:
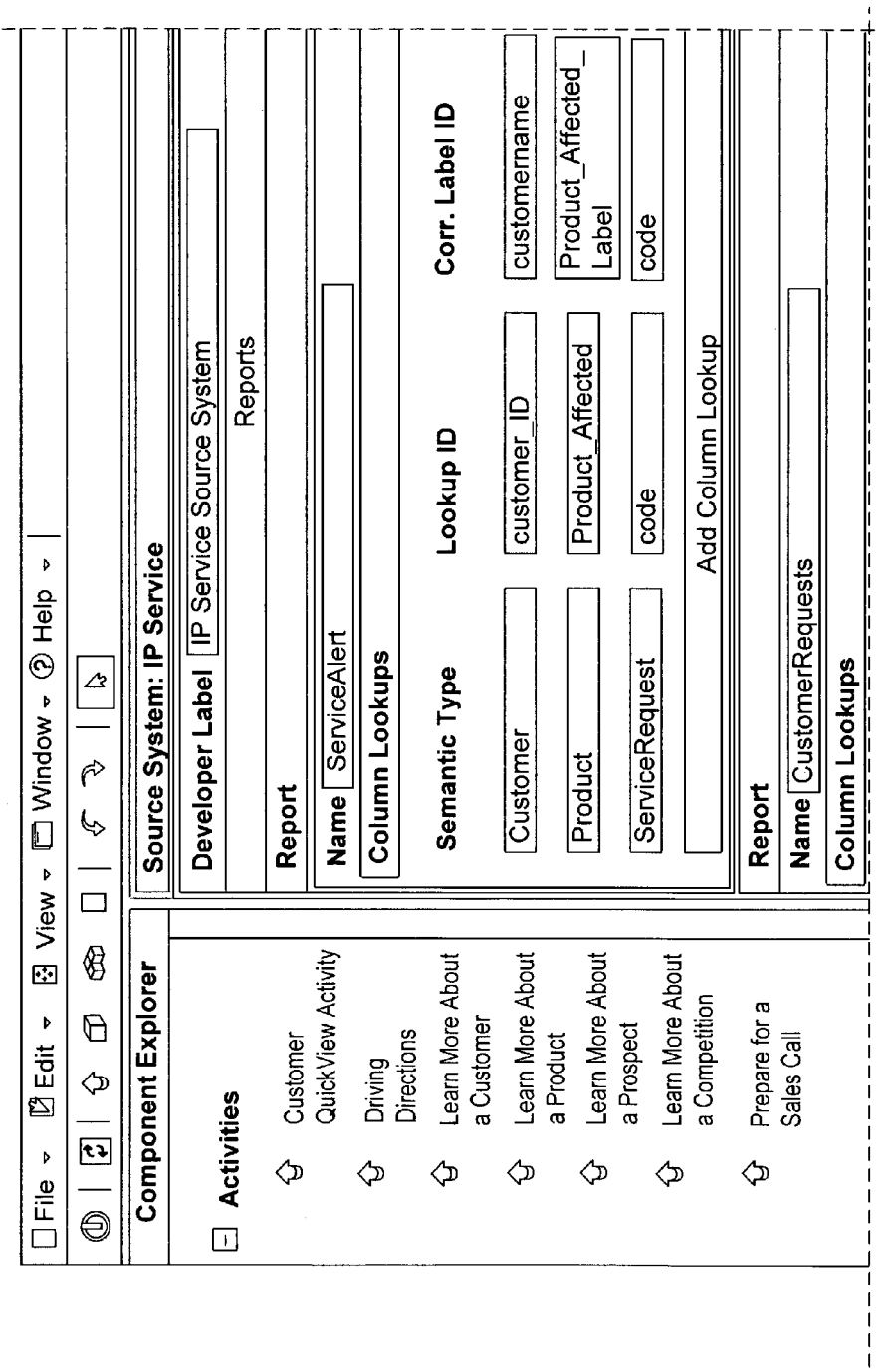
Figure 11B:
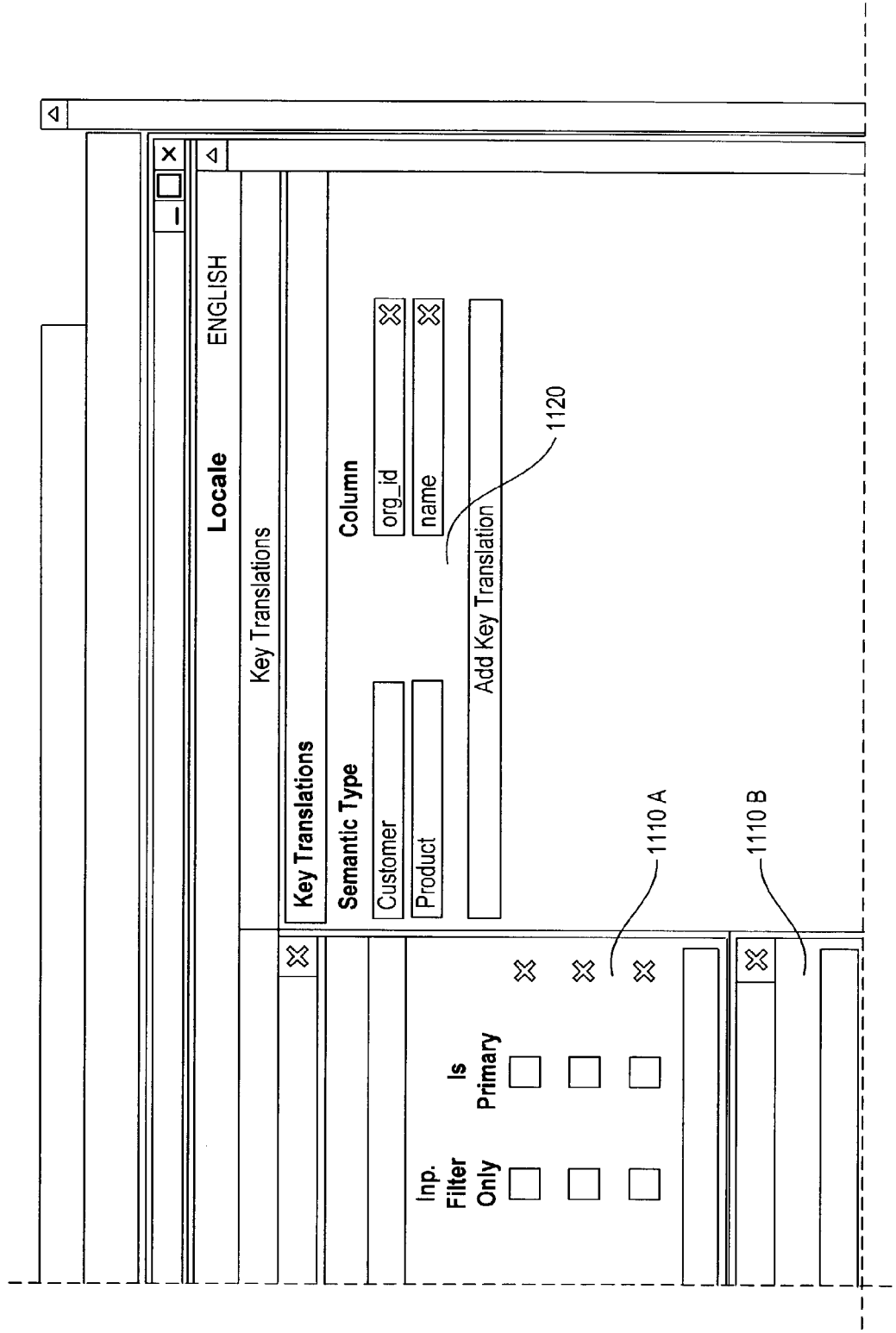
Figure 11D:
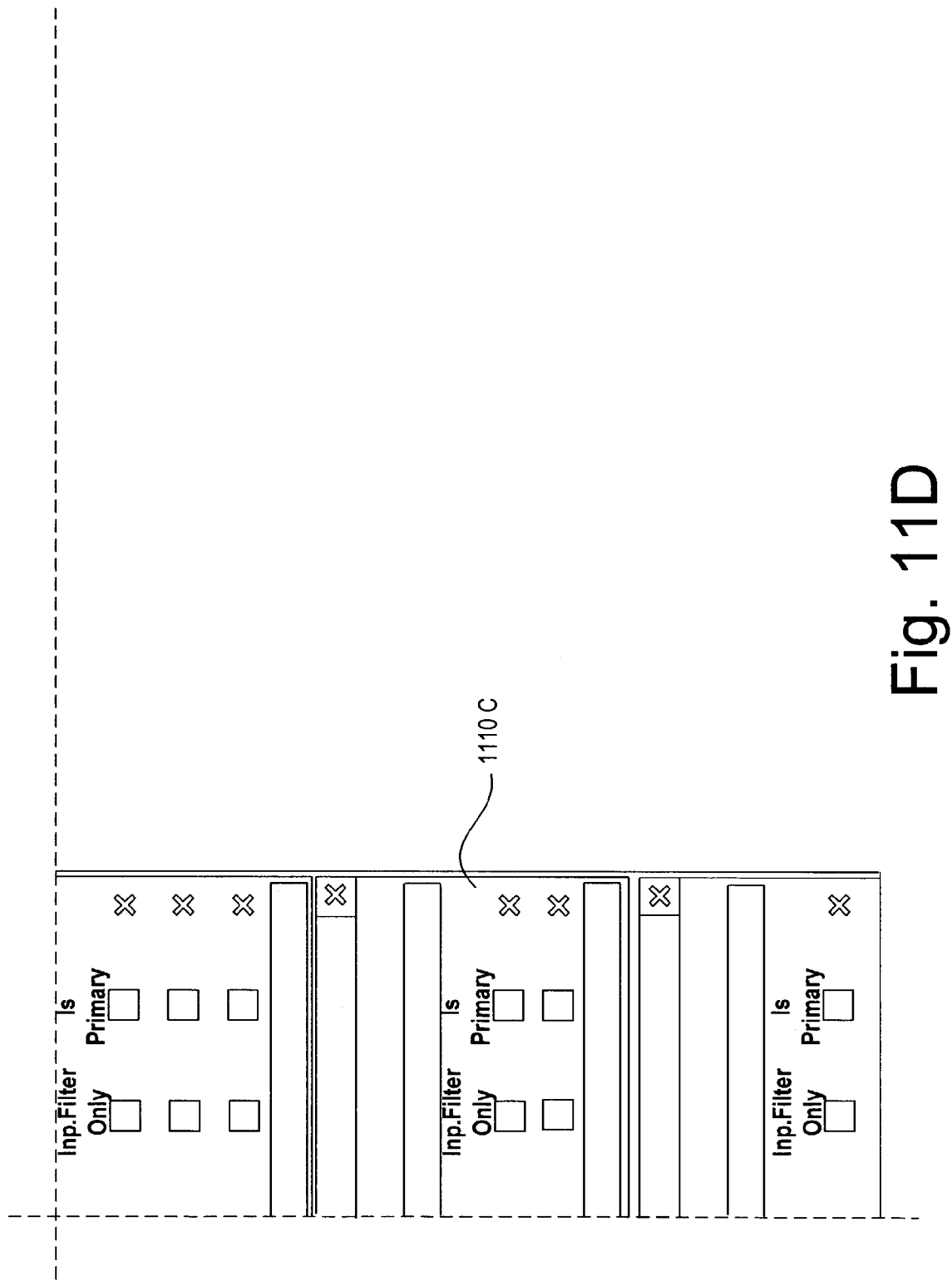

In some embodiments, the user interface of computer program 200 is displayed on a PDA 140*n*. FIG. 10 shows an exemplary windows 1000 generated by an embodiment of computer program 200 (FIG. 2) executed by PDA 140A (FIG. 1). As discussed above, the invention is not limited to client computers and PDAs, rather devices other than client computers and PDAs can be used in accordance to the principles of the invention.

FIGS. 11A-D illustrate a user interface 1100 for specifying semantic type information in a window displayed by computer program 200, in accordance to some embodiments of the invention. User interface 1100 provides two types of facilities to associate semantic type information with information extracted by an IC 320: column lookups 1110*n* and key translations 1120. Column lookups 1110*n* allow a user to define a semantic type for a report generated by an IC 320. Key translations 1120, by contrast, allow a user to specify a semantic type to be associated with a specific column of an information source 210*n*. IC 320, therefore, use column lookup 1110*n* to recognize the semantic type of data retrieved during execution and key translations 1120 to request data of a given semantic type from an information source 210*n*.

Embodiments described above illustrate, but do not limit the invention. For example, the invention is not limited to any particular hardware/software combination. In fact, other hardware/software could be used in place of the ones described herein, in accordance to the principles of the invention. Other embodiments and varieties are within the scope of the invention, as defined by the following claims.

We claim:

1. A computer system for integrating heterogeneous information, the system comprising:

a computer; and a computer program executable by the computer, the computer program comprising computer instructions for:

extracting information from one or more heterogeneous information sources through one or more information objects;

providing a user interface that allows a user to navigate through a current task, wherein the current task includes a sequence of steps and the extracted information is processed during each step; and during navigation of the current task, automatically identifying one or more related tasks by matching the extracted information processed during each step of the current task with the one or more related tasks and automatically generating links to the one or more related tasks wherein the steps capture workflows by defining which steps may be executed after execution of a current step, wherein at the conclusion of each step a new task is dynamically determined based on semantic types generated during execution of the current step.

2. The computer system of claim 1, wherein at least one information source is a plurality of heterogeneous information sources.

3. The computer system of claim 1, wherein the heterogeneous information sources include one or more databases having different database management systems.

4. The computer system of claim 1, wherein each information object includes an input parameter definition and an output parameter definition.

5. The computer system of claim 4, wherein the computer program further comprises computer instructions for:

displaying the extracted information during each step.

6. The computer system of claim 4, wherein the input parameter definition and the output parameter definition specify one or more semantic types.

7. The computer system of claim 6, wherein the related tasks are identified based on the semantic types specified by the output parameter definition of the last completed step.

8. The computer system of claim 6, wherein each semantic type is associated with information extracted from heterogeneous information sources through one or more information objects.

9. The computer system of claim 1, wherein processing the extracted information during each step includes modifying the information prior to display.

10. The computer system of claim 1, wherein the user interface allows a user to navigate through the current task by selecting an initial step and, upon completion of the initial step, selecting a next step in the sequence of steps associated with the current task.

11. The computer system of claim 1, wherein the current task consists of a single step during which a plurality of information objects are processed.

12. The computer system of claim 1, wherein the computer program further comprises computer instructions for:

providing a graphical editor that allows the user to add, delete or modify tasks.

13. The computer system of claim 1, wherein the computer program further comprises computer instructions for:

during navigation of the current task, automatically generating links to one or more related tasks depending on one or more business rules.

14. The Computer system of claim 1, wherein the new tasks are determined by both the semantic types and business rules used to analyze the semantic types.

15. A computer-implemented method for integrating heterogeneous information, the method comprising:
  extracting information from one or more heterogeneous information sources through one or more information objects;
  providing a user interface that allows a user to navigate through a current task, wherein the current task includes a sequence of steps and the extracted information is processed during each step; and
  during navigation of the current task, automatically identifying one or more related tasks by matching the extracted information processed during each step of the current task with the one or more related tasks, wherein the one or more related tasks each include a sequence of steps and the extracted information is processed during the steps, and automatically generating links to the one or more related tasks,
  wherein the steps capture workflows by defining which steps may be executed after execution of a current step,
  wherein at the conclusion of each step a new task is dynamically determined based on semantic types generated during execution of the current step.

16. The computer-implemented method of claim 15, wherein at least one information source is a plurality of heterogeneous information sources.

17. The computer-implemented method of claim 15, wherein the heterogeneous information sources include one or more databases having different database management systems.

18. The computer-implemented method of claim 15, wherein each information object includes an input parameter definition and an output parameter definition.

19. The computer-implemented method of claim 18, further comprising:
  displaying the information during each step.

20. The computer-implemented method of claim 18, wherein the input parameter definition and the output parameter definition specify one or more semantic types.

21. The computer-implemented method of claim 20, wherein the related tasks are identified based on the semantic types specified by the output parameter definition of the last completed step.

22. The computer-implemented method of claim 20, wherein each semantic type is associated with information extracted from heterogeneous information sources through one or more information objects.

23. The computer-implemented method of claim 15, wherein processing the extracted information during each step includes modifying the information prior to display.

24. The computer-implemented method of claim 15, wherein the user interface allows a user to navigate through the current task by selecting an initial step and, upon completion of the initial step, selecting a next step in the sequence of steps associated with the current task.

25. The computer-implemented method of claim 15, wherein the current task consists of a single step during which a plurality of information objects are processed.

26. The computer-implemented method of claim 15, further comprising:
  providing a graphical editor that allows the user to add, delete or modify tasks.

27. The computer-implemented method of claim 15, further comprising:
  during navigation of the current task, automatically generating links to one or more related tasks depending on one or more business rules.

28. The Computer implemented method of claim 15, wherein the new tasks are determined by both the semantic types and business rules used to analyze the semantic types.

29. A computer-readable storage medium storing computer instructions for:
  extracting information from one or more heterogeneous information sources through one or more information objects;
  providing a user interface that allows a user to navigate through a current task, wherein the current task includes a sequence of steps and the extracted information is processed during each step; and
  during navigation of the current task, automatically identifying one or more related tasks by matching the extracted information processed during each step of the current task with the one or more related tasks and upon automatic identification of the one or more related tasks, automatically generating links to the one or more related tasks
  wherein the steps capture workflows by defining which steps may be executed after execution of a current step,
  wherein at the conclusion of each step a new task is dynamically determined based on semantic types generated during execution of the current step.

30. The computer-readable storage medium of claim 29, wherein at least one information source is a plurality of heterogeneous information sources.

31. The computer-readable storage medium of claim 29, wherein the heterogeneous information sources include one or more databases having different database management systems.

32. The computer-readable storage medium of claim 29, wherein each information object includes an input parameter definition and an output parameter definition.

33. The computer-readable storage medium of claim 32, storing further instructions for displaying the information during each step.

34. The computer-readable storage medium of claim 32, wherein the input parameter definition and the output parameter definition specify one or more semantic types.

35. The computer-readable storage medium of claim 34, wherein the related tasks are identified based on the semantic types specified by the output parameter definition of the last completed step.

36. The computer-readable storage medium of claim 34, wherein each semantic type is associated with information extracted from heterogeneous information sources through one or more information objects.

37. The computer-readable storage medium of claim 29, wherein processing the extracted information during each step includes modifying the information prior to display.

38. The computer-readable storage medium of claim 29, wherein the user interface allows a user to navigate through the current task by selecting an initial step and, upon completion of the initial step, selecting a next step in the sequence of steps associated with the current task.

39. The computer-readable storage medium of claim 29, wherein the current task consists of a single step during which a plurality of information objects are processed.

40. The computer-readable storage medium of claim 29, wherein the computer program further comprises computer instructions for:
  providing a graphical editor that allows the user to add, delete or modify tasks.

41. The computer-readable storage medium of claim 29, wherein the computer program further comprises computer instructions for:

during navigation of the current task, automatically generating links to one or more related tasks depending on one or more business rules.

42. The computer-readable storage medium of claim 29, wherein the sequence of steps comprised of objects written in Java language and use Java classes to implement business logic, wherein the objects consist of three Java classes, wherein the three Java classes are i) an input parameter class, which encapsulates information available to the information components when executing, ii) a Java class, comprised of the information components containing code to connect and to get information from a data source and iii) an output parameter class, which encapsulates information that is available for display and to pass to other nuggets or an activity after the information component has executed.

* * * * *